United States Patent
Gale et al.

(10) Patent No.: US 9,821,810 B2
(45) Date of Patent: Nov. 21, 2017

(54) METHOD AND SYSTEM FOR HEATING AUXILIARY BATTERY OF VEHICLE

(75) Inventors: Allan Roy Gale, Livonia, MI (US); Bruce Carvell Blakemore, Plymouth, MI (US); Paul Theodore Momcilovich, Tecumseh, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1162 days.

(21) Appl. No.: 13/618,300

(22) Filed: Sep. 14, 2012

(65) Prior Publication Data

US 2014/0076875 A1 Mar. 20, 2014

(51) Int. Cl.
*B60W 30/188* (2012.01)
*B60W 10/30* (2006.01)
(Continued)

(52) U.S. Cl.
CPC ......... *B60W 30/1886* (2013.01); *B60L 1/003* (2013.01); *B60L 1/02* (2013.01); *B60L 3/0046* (2013.01); *B60L 7/12* (2013.01); *B60L 7/26* (2013.01); *B60L 11/14* (2013.01); *B60L 11/1805* (2013.01); *B60L 11/1872* (2013.01); *B60L 11/1875* (2013.01); *B60L 15/20* (2013.01); *B60L 15/2009* (2013.01); *B60W 10/30* (2013.01); *H01M 10/615* (2015.04); *H01M 10/625* (2015.04); *H01M 10/657* (2015.04); *B60K 2006/4825* (2013.01); *B60L 2240/545* (2013.01); *B60L 2240/547* (2013.01); *B60L 2240/549* (2013.01); *B60L 2240/662* (2013.01); *B60W 2510/305* (2013.01); *B60W 2710/246* (2013.01); *B60Y 2400/112* (2013.01); *H01M 2220/20* (2013.01); *H02J 2007/0067* (2013.01); *Y02T 10/6252* (2013.01); *Y02T 10/645* (2013.01); *Y02T 10/70* (2013.01);
(Continued)

(58) Field of Classification Search
CPC ............. B60L 11/18; B60W 2710/246; B50W 30/1886; B60Y 2400/112; H01M 10/5006; H01M 10/5016; H01M 2220/20; H02J 7/0052–7/0054
USPC .................. 219/201, 202, 209; 320/127–136
See application file for complete search history.

(56) References Cited

U.S. PATENT DOCUMENTS 5,362,942 A * 11/1994 Vanderslice et al. ......... 219/209
7,382,102 B2 * 6/2008 Ashtiani ........................ 318/139
(Continued)

FOREIGN PATENT DOCUMENTS

CN 101454514 A 6/2009

OTHER PUBLICATIONS

State Intellectual Property Office, First Office Action for the corresponding Chinese Patent Application No. 201310415183.9 dated Jul. 1, 2016.
(Continued)

*Primary Examiner* — Sang Y Paik
(74) *Attorney, Agent, or Firm* — David B. Kelley; Brooks Kushman P.C.

(57) ABSTRACT

A vehicle includes an auxiliary battery and one or more accessory loads. An accessory load command is modulated such that the auxiliary battery outputs a discharge current to an accessory load. The discharge current has, in addition to a current component for driving the accessory load, an alternating current (AC) component to cause a temperature of the auxiliary battery to increase.

19 Claims, 2 Drawing Sheets

(51) Int. Cl.

| | | |
|---|---|---|
| *H01M 10/625* | (2014.01) | |
| *H01M 10/615* | (2014.01) | |
| *H01M 10/657* | (2014.01) | |
| *B60L 1/00* | (2006.01) | |
| *B60L 1/02* | (2006.01) | |
| *B60L 3/00* | (2006.01) | |
| *B60L 7/12* | (2006.01) | |
| *B60L 7/26* | (2006.01) | |
| *B60L 11/14* | (2006.01) | |
| *B60L 11/18* | (2006.01) | |
| *B60L 15/20* | (2006.01) | |
| *B60K 6/48* | (2007.10) | |
| *H02J 7/00* | (2006.01) | |

(52) U.S. Cl.
CPC .......... *Y02T 10/705* (2013.01); *Y02T 10/7005* (2013.01); *Y02T 10/7077* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

| | | |
|---|---|---|
| 2006/0152085 A1 | 7/2006 | Flett et al. |
| 2006/0290325 A1 | 12/2006 | Ashtiani |
| 2010/0270976 A1 | 10/2010 | Tamura |
| 2011/0074326 A1 | 3/2011 | Su |
| 2013/0033232 A1* | 2/2013 | Kosugi et al. ................ 320/128 |

OTHER PUBLICATIONS

State Intellectual Property Office, English translation of the First Office Action for the corresponding Chinese Patent Application No. 201310415183.9 dated Jul. 1, 2016.

* cited by examiner

METHOD AND SYSTEM FOR HEATING AUXILIARY BATTERY OF VEHICLE

TECHNICAL FIELD

The present invention relates to heating an auxiliary battery of a vehicle.

BACKGROUND

The phrase "electric vehicle" herein encompasses hybrid electric vehicles (HEV), plug-in hybrid electric vehicles (PHEV), battery-only electric vehicles (BEV), and the like. An electric vehicle has a motor interposed between a traction battery and a drive shaft of the vehicle, wherein the motor is coupled to the vehicle driveline. The motor may use energy from the traction battery to contribute torque to the vehicle wheels for propelling the vehicle.

Many electric vehicles have a low voltage auxiliary battery for providing energy to accessory loads such as circulation fans, heaters, pumps, etc. Advanced battery technology is being considered to augment or replace the auxiliary battery. A concern is that these advanced batteries will not accept a rapid recharge while their battery cells are at low temperatures even though they retain the ability to provide substantial amounts of energy. In start/stop vehicles this may result in a depleted battery after a series of start/stop events or the inability to provide the start/stop function after an extended period of time. One method of overcoming this problem is to cycle energy in and out of the battery in an effort to cause cell heating. However, at low temperatures little energy can be put back into the battery thereby reducing the battery cycling effectiveness.

SUMMARY

An embodiment of the present invention provides a method which includes modulating a command such that an auxiliary battery outputs to an accessory load a discharge current having, in addition to a current component for driving the accessory load, an alternating current (AC) component to cause a temperature of the auxiliary battery to increase.

The current component for driving the accessory load may be a direct current (DC) component. The AC component causes the temperature of the auxiliary battery to increase faster than the current component for driving the accessory load. The AC component may have a frequency(s) between 0 Hz and 300 Hz.

The method may further include modifying the command to decrease the AC component as the temperature of the auxiliary battery increases. Likewise, the method may further include modifying the command to increase the AC component while the temperature of the auxiliary battery has not increased sufficiently.

An embodiment of the present invention provides a vehicle having an accessory load, an auxiliary battery electrically connected with the accessory load, and a controller. The controller is configured to modulate a command for the accessory load such that the auxiliary battery outputs to the accessory load a discharge current having, in addition to a current component for driving the accessory load, an alternating current (AC) component to cause a temperature of the auxiliary battery to increase.

An embodiment of the present invention provides a vehicle having an accessory load and an auxiliary battery. The auxiliary battery is configured to output a discharge current to the accessory load in response to a modulated command. In response to the discharge current, the accessory load is driven. The discharge current includes, based on the modulated command, in addition to a current component for driving the accessory load, an alternating current (AC) component that causes a temperature of the auxiliary battery to increase.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
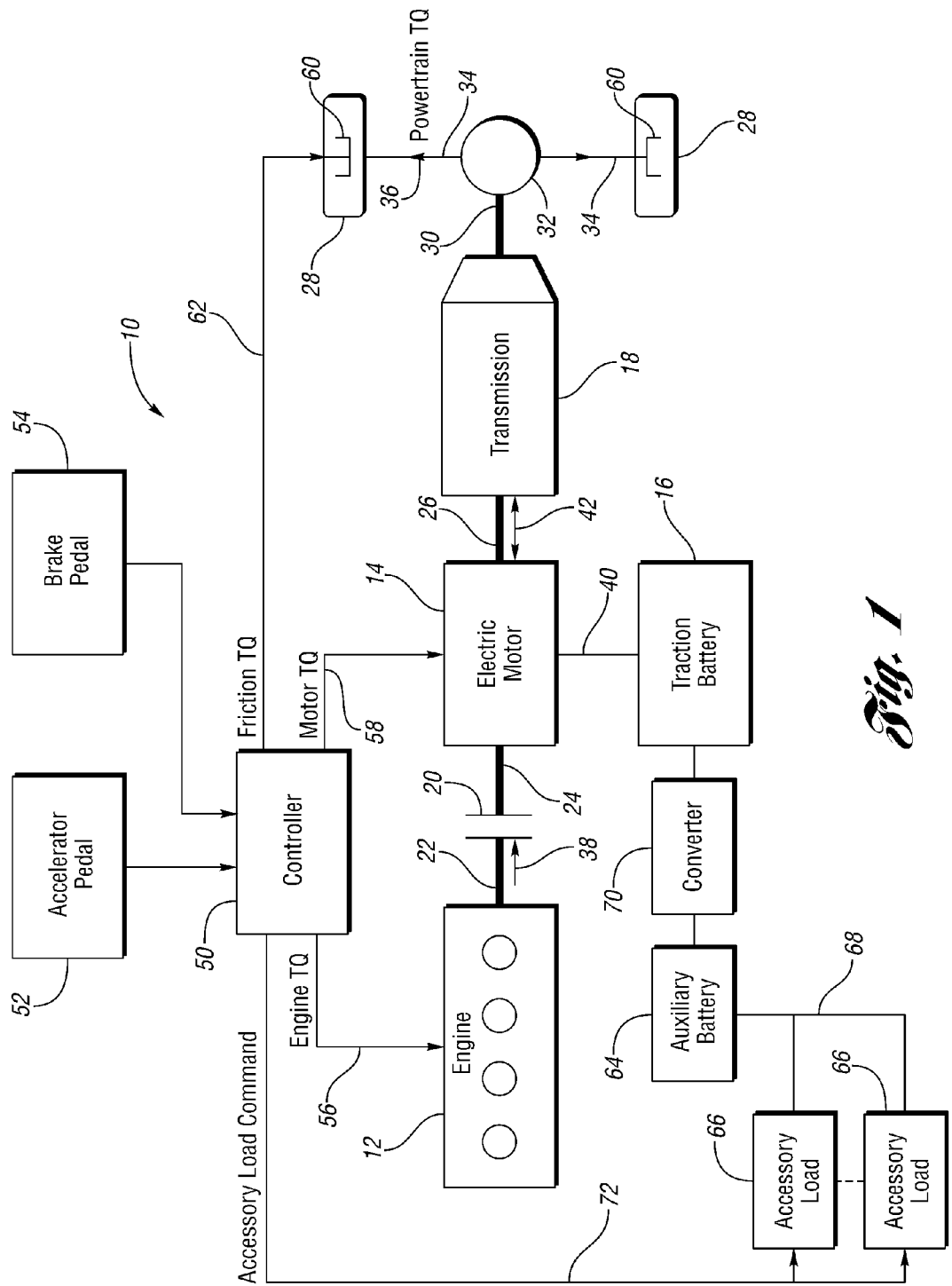
FIG. 1 illustrates a block diagram of an exemplary hybrid vehicle powertrain in accordance with an embodiment of the present invention.

Referring now to FIG. 1, a block diagram of an exemplary powertrain system 10 for a hybrid electric vehicle (HEV) in accordance with an embodiment of the present invention is shown. Powertrain system 10 includes an engine 12, an electric machine such as an electric motor/generator 14 ("motor"), a traction battery 16, and a transmission 18.

Engine 12 and motor 14 are drive sources for the vehicle. Engine 12 is connectable in series to motor 14 through a disconnect clutch 20. Engine 12 has an engine shaft 22 connectable to an input shaft 24 of motor 14 through disconnect clutch 20. Motor 14 is connected to the input side of transmission 18. For example, motor 14 may be connected to transmission 18 via a torque converter. Motor 14 has an output shaft 26 connected to the input side of transmission 18. Transmission 18 is connected in series with both engine 12 and motor 14 when engine 12 is connected to motor 14 via disconnect clutch 20. In this case, transmission 18 is connected to motor 14 while at the same time being connected to engine 12 via motor 14.

On the output side, transmission 18 is connected to drive wheels 28 of the vehicle. The driving force applied from engine 12 and/or motor 14 is transmitted through transmission 18 to drive wheels 28 thereby propelling the vehicle. The output side of transmission 18 includes an output shaft 30 connected to a differential 32. Drive wheels 28 are connected to differential 32 through respective axles 34. With this arrangement, transmission 18 transmits a powertrain output torque 36 to drive wheels 28.

Engine 12 is a one source of power for powertrain system 10. Engine 12 generates an engine power having an engine torque 38 that is supplied to transmission 18 when engine 12 is connected to motor 14 via disconnect clutch 20. The engine power corresponds to the product of engine torque 38 and the engine speed of engine 12. To drive the vehicle with engine 12, at least a portion of engine torque 38 passes from engine 12 through disconnect clutch 20 to motor 14 and from motor 14 to transmission 18.

Traction battery 16 is another source of power for powertrain system 10. Motor 14 is linked to traction battery 16 through wiring 40. Depending on the particular operating mode of the vehicle, motor 14 either converts electric energy stored in traction battery 16 into a motor power having a motor torque 42 or sends a corresponding amount of electrical power to traction battery 16 when operating as a generator. The motor power corresponds to the product of motor torque 42 and the motor speed of motor 14. To drive the vehicle with motor 14, motor torque 42 is transmitted from motor 14 to transmission 18. When generating electrical power for storage in traction battery 16, motor 14 obtains power either from engine 12 in a driving mode or from the inertia in the vehicle as motor 14 acts as a brake when operating in a regenerative braking mode.

As described, engine 12, motor 14, and transmission 18 are connectable sequentially in series as illustrated in FIG. 1. As such, powertrain system 10 represents a modular hybrid transmission ("MHT") configuration in which engine 12 is connected to motor 14 by disconnect clutch 20 with motor 14 being connected to transmission 18.

The state or mode of disconnect clutch 20 being engaged or disengaged determines which input torques 38 and 42 are transferred to transmission 18. For example, if disconnect clutch 20 is disengaged, then only motor torque 42 is supplied to transmission 18. If disconnect clutch 20 is engaged, then both engine torque 38 and motor torque 42 are supplied to transmission 18. Of course, if motor 14 is not energized, then only engine torque 38 is supplied to transmission 18.

Transmission 18 includes clutches, bands, gears, and the like, and may include one or more planetary gear sets to selectively effect different discrete gear ratios by selective engagement of friction elements to establish the torque flow paths and provide the corresponding desired multiple step-ratios. The friction elements are controllable through a shift schedule that connects and disconnects certain elements of the planetary gear sets to control the ratio between the transmission input and the transmission output. Transmission 18 is automatically shifted from one ratio to another based on the needs of the vehicle. Transmission 18 then provides powertrain output torque 36 to output shaft 30 which ultimately drives drive wheels 28. The kinetic details of transmission 18 can be established by a wide range of transmission arrangements.

Powertrain system 10 further includes a vehicle system controller 50. Controller 50 may be one or more controllers and is configured to control operation of the elements of powertrain system 10 including other vehicle elements as described herein. Powertrain system 10 further includes an accelerator pedal 52 and a brake pedal 54 both in communication with controller 50.

The driver of the vehicle depresses accelerator pedal 52 to propel the vehicle. A drive command based on the position of accelerator pedal 52 is provided to controller 50. Controller 50 apportions the drive command between the engine power and the motor power to be provided to transmission 18 for propelling the vehicle. In particular, controller 50 apportions the drive command between (i) an engine torque signal 56 (which represents the amount of engine torque 38 to be provided from engine 12, operating at a corresponding engine speed) and (ii) a motor torque signal 58 (which represents the amount of motor torque 42 to be provided from motor 14, operating at a corresponding motor speed). In turn, engine 12 generates the engine power having engine torque 38 and motor 14 generates the motor power having motor torque 42. Both engine torque 38 and motor torque 42 are supplied to transmission 18 (assuming that engine 12 is connected to motor 14 via disconnect clutch 20) such that the vehicle is propelled. In this case, powertrain output torque 36 corresponds to the summation of engine torque 38 and motor torque 42.

Motor 14 receives a discharge current from traction battery 16 in order to generate motor torque 42. The discharge current for generating motor torque 42 is a direct current (DC) load of traction battery 16. Motor 14 converts this discharge current into a mechanical torque (i.e., motor torque 42). The amount of discharge current from traction battery 16 corresponds to the amount of motor torque 42 to be generated. Of course, the discharge current from traction battery 16 at a fixed voltage of traction battery 16 is proportional to motor power (i.e., V*I=Power) and the motor power is the product of motor torque 42 and the speed of motor 14. As noted above, the amount of motor torque 42 to be generated is based on motor torque signal 58 from controller 50. Thus, controller 50 can control motor 14 to generate different motor torques 42 by obtaining correspondingly different discharge currents from traction battery 16. As such, controller 50 controls motor 14 to generate different motor torques 42 by commanding correspondingly different motor torque signals 58 to motor 14.

The driver of the vehicle depresses brake pedal 54 to slow or brake the vehicle. A brake command based on the positioning of brake pedal 54 is provided to controller 50. Controller 50 apportions the brake command between (i) powertrain braking power to be provided by engine 12 and/or motor 14 to transmission 18 and (ii) friction braking power to be applied by friction brakes 60 on drive wheels 28. The powertrain braking power represents the amount of "negative" powertrain power to be provided. Controller 50 apportions the powertrain braking power between (i) an engine torque signal 56 (which represents the amount of negative engine torque 38 to be provided from engine 12, operating at a corresponding engine speed) and (ii) a motor torque signal 58 (which represents the amount of negative motor torque 42 to be provided from motor 14, operating at a corresponding motor speed). Engine 12 generates the engine power having negative engine torque 38 and motor 14 generates the motor power having negative motor torque 42. Engine torque 38 and motor torque 42 are supplied to transmission 18 (assuming that engine 12 is connected to motor 14 via disconnect clutch 20) to brake the vehicle. Controller 50 further generates a friction braking torque signal 62 (which represents the amount of torque to be obtained through friction brakes 60). Friction brakes 60 apply the friction braking torque to drive wheels 28 to brake the vehicle.

Powertrain system 10 further includes an auxiliary battery 64 and one or more accessory loads 66. Auxiliary battery 64 and accessory loads 66 are electrically connected to one another via a voltage bus 68. Auxiliary battery 64 provides electrical energy to accessory loads 66 for their operation via voltage bus 68. Accessory loads 66 include low-voltage (LV) vehicle accessories such as a cooling pump, fans, electric pumps, heaters, power steering, etc.

Traction battery 16 and auxiliary battery 64 are electrically connectable to one another via an interface 70. Interface 70 may be in the form of a converter such as a DC/DC (direct current/direct current) converter. Converter 70 may be a buck boost converter that functions in a bi-directional manner to either step a low-voltage of, for example, 12 V (e.g., a typical voltage of auxiliary battery 64) up to a high voltage of, for example, 400 V (e.g., a typical voltage of traction battery 16) or to step down the high voltage to the low voltage when traction battery 16 and auxiliary battery 64.

As described, powertrain system 10 includes high and low voltage electrical systems. The high voltage (HV) electrical system, which includes traction battery 16, provides electric energy for vehicle propulsion. The low voltage (LV) electrical system, which includes auxiliary battery 64, provides electric energy for vehicle accessories (i.e., accessory loads 66). The high and low voltage electrical systems interface via converter 70. As an example, traction battery 16 includes one or more electric batteries and/or capacitors suitable for meeting electric energy needs for vehicle propulsion, whereas auxiliary battery 64 is a "12V" type of battery suitable for meeting electric energy needs for vehicle accessories. As an example, auxiliary battery 64 employs Lithium Ion technology.

Controller 50 is in communication with accessory loads 66 and is configured to individually control the operation of accessory loads 66. An accessory load 66 is driven to generate an output by receiving an electrical discharge current from auxiliary battery 64 via voltage bus 68. The discharge current for driving accessory load 66 is a direct current (DC) load of auxiliary battery 64. The amount of discharge current from auxiliary battery 64 generally corresponds to how hard accessory load 66 is to be driven. Controller 50 generates an accessory load command signal 72 which represents how hard accessory load 66 is to be driven. Thus, accessory load command signal 72 is indicative of the discharge current to be provided from auxiliary battery 64 to accessory load 66. As such, controller 50 can control accessory load 66 to be driven differently by receiving corresponding different discharge currents from auxiliary battery 64. Thus, controller 50 controls accessory load 66 to generate different outputs by commanding correspondingly different accessory load command signals 72 to accessory load 66.

The recharge (i.e., charge/discharge/charge) capability of auxiliary battery 64 becomes limited as the temperature of auxiliary battery 64 falls below freezing. Control strategies in accordance with embodiments of the present invention add an alternating current (AC) component to the discharge current load of auxiliary battery 64 in order to heat auxiliary battery 64. That is, these control strategies modify the discharge current load of auxiliary battery 64 to include an AC component for heating auxiliary battery 64. For instance, the cells of auxiliary battery 64 are heated. In one embodiment, controller 50 adds an AC disturbance to accessory load command signal 72 in order to add the AC component to the discharge current load of auxiliary battery 64. In one embodiment, the AC component is a low frequency AC component on the order between 0 Hz and 300 Hz.

As an example of adding an AC component to the discharge current of auxiliary battery 64, a ten amp DC current draw on auxiliary battery 64 is considered. If a ten amp peak-to-peak AC current draw is added to the DC current, then auxiliary battery 64 will not experience a charge current. However, in this example, the average current draw will remain ten amps with a 12% increase in the battery I2R loss.

Figure 2:
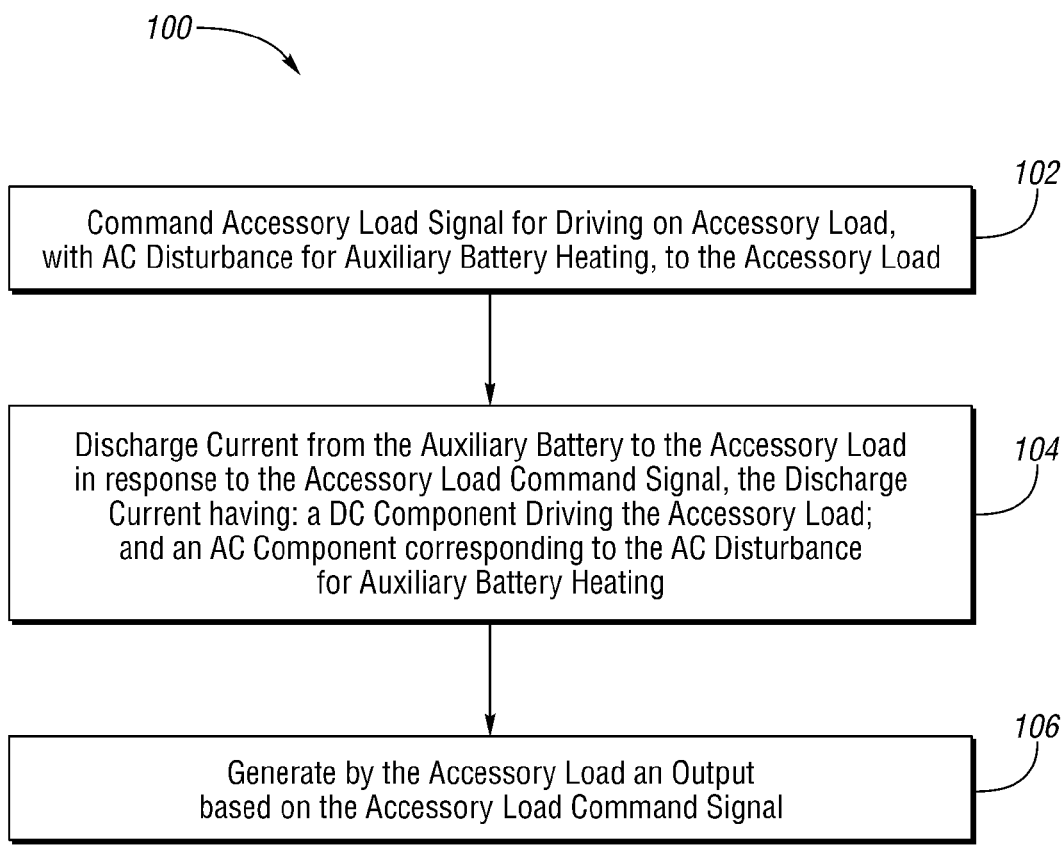
FIG. 2 illustrates a flowchart describing operation of a method and system for modifying the discharge current of an auxiliary battery for an accessory load to include an AC component that causes the auxiliary battery to be heated in accordance with an embodiment of the present invention.

Referring now to FIG. 2, a flowchart 100 describing operation of a method and system for modifying the discharge current of auxiliary battery 64 for an accessory load 66 to include an AC component that causes auxiliary battery 64 to be heated in accordance with an embodiment of the present invention is shown. The operation begins with controller 50 generating an accessory load command signal 72 in order to drive an accessory load 66. Controller 50 generates accessory load command signal 72 with an added AC component disturbance. As such, accessory load command signal 72 includes a component for driving accessory load 66 and a component indicative of an AC current load. The component for driving accessory load 66 may be a DC current load. The component for driving accessory load 66 corresponds to how hard accessory load 66 is to be driven. The AC component corresponds to the added AC disturbance for heating of auxiliary battery 64. Without the added AC component disturbance, accessory load command signal 72 would be a typical accessory load command signal entirely indicative of the DC current load to be received by accessory load 66 for accessory load 66 to be driven. Accessory load command signal 72 for driving accessory load 66, with the added AC disturbance for auxiliary battery heating, is commanded to accessory load 66 as shown in block 102.

In response to accessory load command signal 72 being commanded from controller 50 to accessory load 66, auxiliary battery 64 discharges electrical current to accessory load 66 as shown in block 104. The discharge current includes the current component for driving accessory load 66 and the AC component corresponding to the added AC disturbance for heating auxiliary battery 64. Accessory load 66 generates an output according to the commanded accessory load signal 72 as shown in block 206.

The AC component can be reduced over time as auxiliary battery 64 heats up such that the discharge current from auxiliary battery 64 is devoid or substantially devoid of the AC component once the temperature of auxiliary battery 64 has increased to a sufficient threshold. Conversely, the AC component of the discharge current from auxiliary battery 64 can be increased over time to account for auxiliary battery 64 not being heated up within a sufficient amount of time.

As described, embodiments of the present invention provide auxiliary battery heating with the addition of low frequency AC current ripple induced by accessory loads. Embodiments of the present invention have applicability with Li-Ion auxiliary batteries. Embodiments of the present invention take advantage of the characteristics that at low AC frequencies (e.g., between 0 Hz to 300 Hz) the temperature of a Li-Ion auxiliary battery can be increased significantly faster than by simply discharging auxiliary battery 64 with a DC current load or with relatively higher AC frequencies. The temperature of auxiliary battery 64 can be increased significantly faster as these low AC frequencies as the battery is most resistive at these low AC frequencies. Accordingly, adding an AC component with frequencies between 0 Hz and 300 Hz to the DC current draw of auxiliary battery 64 can effectively reduce the amount of time to warm the battery. As a result, the charge/discharge/charge capability of auxiliary battery 64 is increased. As described herein, adding this frequency component (or frequencies components) to the DC current draw from auxiliary battery 64 can be accomplished by adding a disturbance to the current controller for the auxiliary components.

As described, the loss of effective cycling of auxiliary battery 64 can be overcome by adding an AC component to the discharge current of auxiliary battery 64 by introducing a low frequency AC disturbance to one or more of accessory loads 66. With the added low frequency(s) disturbance from one or more of accessory loads 66, the time for auxiliary battery 64 to reach a temperature that allows implementation of full operational battery functions is reduced. As described, a method of adding the low frequency or frequencies component to the DC current draw from auxiliary battery 64 can be accomplished by adding a disturbance to the current controller for the drive system. This can be accomplished in various ways as known to those of ordinary skill in the art. One example of this is described in IEEE Vehicle Power and Propulsion Conference (VPPC), Sep. 3-5, 2008, Harbin, China 978-1-4244-1849-7/08 2008, IEEE Design & Implementation of a Novel Vector-Controlled Drive by Direct Injection of Random Signal, A. Zabihinejad and J. S. Moghani.

As described herein, powertrain system 10 is an example of a powertrain system for use with embodiments of the present invention. Powertrain system 10 represents a parallel hybrid electric vehicle configuration. Other hybrid electric vehicle powertrains may be used with embodiments of the present invention. Likewise, plug-in hybrid electric vehicle powertrains and battery-only electric vehicle powertrains may be used with embodiments of the present invention. In general, any vehicle having a battery for driving accessory loads may be used with embodiments of the present invention.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
modulating a command for an accessory load such that an auxiliary battery outputs to the accessory load a discharge current having, in addition to a current component for driving the accessory load, an alternating current (AC) component to cause a temperature of the auxiliary battery to increase.

2. The method of claim 1 wherein:
the current component for driving the accessory load is a direct current (DC) component.

3. The method of claim 1 wherein:
outputting the AC component causes the temperature of the auxiliary battery to increase faster than outputting the current component for driving the accessory load without outputting the AC component.

4. The method of claim 1 wherein:
the AC component has a frequency between 0 Hz and 300 Hz.

5. The method of claim 1 further comprising:
modifying the command to decrease the AC component as the temperature of the auxiliary battery increases.

6. The method of claim 1 further comprising:
modifying the command to increase the AC component over time.

7. The method of claim 1 wherein:
the AC component outputted from the auxiliary battery varies as the temperature of the auxiliary battery increases.

8. A system comprising:
an auxiliary battery electrically connected with an accessory load; and
a controller configured to modulate a command for the accessory load such that the auxiliary battery discharges and outputs to the accessory load a discharge current having, in addition to a current component for driving the accessory load, an alternating current (AC) component, variable based on a temperature of the auxiliary battery, to cause the temperature of the auxiliary battery to increase.

9. The system of claim 8 wherein:
the current component for driving the accessory load is a direct current (DC) component.

10. The system of claim 8 wherein:
outputting the AC component causes the temperature of the auxiliary battery to increase faster than outputting the current component for driving the accessory load without outputting the AC component.

11. The system of claim 8 wherein:
the AC component has a frequency between 0 Hz and 300 Hz.

12. The system of claim 8 wherein:
the controller is further configured to modify the modulated command to decrease the AC component over time.

13. The system of claim 8 wherein:
the controller is further configured to modify the modulated command to increase the AC component over time.

14. A vehicle comprising:
an accessory load; and
an auxiliary battery configured to discharge to output a discharge current to the accessory load in response to a modulated command, wherein in response to the discharge current, the accessory load is driven and wherein the discharge current includes, based on the modulated command, in addition to a current component for driving the accessory load, an alternating current (AC) component, variable based on a temperature of the auxiliary battery, that causes the temperature of the auxiliary battery to increase.

15. The vehicle of claim 14 wherein:
the current component for driving the accessory load is a direct current (DC) component.

16. The vehicle of claim 14 wherein:
the AC component has a frequency between 0 Hz and 300 Hz.

17. The vehicle of claim 14 further comprising:
a controller configured to generate a command for the accessory load such that the auxiliary battery outputs the discharge current.

18. The vehicle of claim 14 wherein:
outputting the AC component causes the temperature of the auxiliary battery to increase faster than outputting the current component for driving the accessory load without outputting the AC component.

19. The vehicle of claim 14 wherein:
the vehicle is one of a hybrid electric vehicle, a plug-in hybrid electric vehicle, and a battery-only electric vehicle.

* * * * *